United States Patent
McLeran et al.

(10) Patent No.: US 9,189,172 B1
(45) Date of Patent: Nov. 17, 2015

(54) HIGH PRIORITY READ AND WRITE

(75) Inventors: Daniel Robert McLeran, Loveland, CO (US); Steven Scott Williams, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/440,285

(22) Filed: Apr. 5, 2012

Related U.S. Application Data

(60) Provisional application No. 61/584,188, filed on Jan. 6, 2012, provisional application No. 61/584,195, filed on Jan. 6, 2012, provisional application No. 61/584,196, filed on Jan. 6, 2012, provisional application No. 61/584,197, filed on Jan. 6, 2012, provisional application No. 61/584,201, filed on Jan. 6, 2012, provisional application No. 61/584,204, filed on Jan. 6, 2012.

(51) Int. Cl.
*G06F 3/00* (2006.01)
*G06F 3/06* (2006.01)

(52) U.S. Cl.
CPC .................................... *G06F 3/0659* (2013.01)

(58) Field of Classification Search
None
See application file for complete search history.

(56) References Cited

U.S. PATENT DOCUMENTS

| | | | |
|---|---|---|---|
| 6,389,427 B1 | 5/2002 | Faulkner | |
| 6,463,509 B1 | 10/2002 | Teoman et al. | |
| 6,834,329 B2 | 12/2004 | Sasaki | |
| 7,380,158 B2 | 5/2008 | Totolos | |
| 7,421,710 B2 | 9/2008 | Qi et al. | |
| 7,457,880 B1 | 11/2008 | Kim | |
| 7,500,063 B2 | 3/2009 | Zohar | |
| 7,526,598 B2 | 4/2009 | Stern et al. | |
| 7,600,244 B2 * | 10/2009 | Maruyama et al. | 725/47 |
| 7,620,620 B1 | 11/2009 | Sedlar | |
| 7,620,773 B2 | 11/2009 | Nicholson | |
| 7,826,161 B2 | 11/2010 | Riedel | |
| 7,853,361 B2 | 12/2010 | Nielsen | |
| 7,877,546 B2 | 1/2011 | Zohar | |
| 8,019,938 B2 | 9/2011 | Flynn | |
| 8,065,470 B2 | 11/2011 | Yano | |
| 8,073,674 B2 | 12/2011 | Gehr et al. | |
| 8,166,164 B1 * | 4/2012 | Luna et al. | 709/224 |

(Continued)

OTHER PUBLICATIONS

Non-Final Office Action, Dec. 20, 2013, U.S. Appl. No. 13/440,228, filed Apr. 5, 2012, Temporal File Defragment, Daniel Robert McLeran.

(Continued)

*Primary Examiner* — Elias Mamo
(74) *Attorney, Agent, or Firm* — Cesari & Reed LLP; Kirk A. Cesari; Christian W. Best

(57) ABSTRACT

The disclosure is related to data storage devices employing file-aware drivers. In one example, a device may comprise a driver configured to retrieve file system information related to an input/output (I/O) command, select priority attributes identifying whether the I/O command originated from a user-level application based on the file system information, and prioritize execution of the I/O command based on the priority attributes. Another embodiment may be a method comprising inspecting characteristics of a data input/output (I/O) request, choosing priority attributes for the I/O request based on the characteristics and a program initiating the I/O request, and executing operations in an order based on the priority attributes.

19 Claims, 4 Drawing Sheets

(56) References Cited

U.S. PATENT DOCUMENTS

| | | | |
|---|---|---|---|
| 8,499,120 | B2 | 7/2013 | Furuhjelm |
| 2003/0185358 | A1* | 10/2003 | Sakamoto ............... 379/102.01 |
| 2005/0232153 | A1* | 10/2005 | Bishop et al. ................ 370/235 |
| 2006/0050714 | A1* | 3/2006 | Blasco Claret et al. .... 370/395.2 |
| 2007/0136541 | A1 | 6/2007 | Herz |
| 2007/0291766 | A1* | 12/2007 | Knazik et al. ........... 370/395.21 |
| 2008/0140921 | A1 | 6/2008 | Sutardja et al. |
| 2008/0162821 | A1 | 7/2008 | Duran et al. |
| 2008/0312754 | A1* | 12/2008 | Nielsen et al. .................... 700/7 |
| 2009/0132760 | A1 | 5/2009 | Flynn et al. |
| 2010/0023712 | A1 | 1/2010 | Yamaguchi et al. |
| 2010/0082936 | A1 | 4/2010 | Hobbet et al. |
| 2010/0153474 | A1 | 6/2010 | Raines |
| 2011/0185043 | A1* | 7/2011 | Zeller et al. ................... 709/219 |
| 2011/0295915 | A1 | 12/2011 | Ejiri |
| 2011/0295934 | A1 | 12/2011 | McCormack et al. |
| 2012/0210066 | A1 | 8/2012 | Joshi et al. |
| 2012/0210068 | A1 | 8/2012 | Joshi et al. |
| 2012/0221774 | A1 | 8/2012 | Atkisson et al. |
| 2014/0297937 | A1 | 10/2014 | Thomas et al. |

OTHER PUBLICATIONS

Non-Final Office Action, Dec. 23, 2013, U.S. Appl. No. 13/440,022, filed Apr. 5, 2012, Smart File Location, Daniel Robert McLeran.

Non-Final Office Action, Jan. 6, 2014, U.S. Appl. No. 13/440,450, filed Apr. 5, 2012, File-Aware Caching Driver, Daniel Robert McLeran.

Non-Final Office Action, Jan. 7, 2014, U.S. Appl. No. 13/440,245, filed Apr. 5, 2012, Cache File Preloading, Daniel Robert McLeran.

Non-Final Office Aciton, Apr. 26, 2013, U.S. Appl. No. 13/440,332, filed Apr. 5, 2012, File-Aware Priority Driver, Daniel Robert McLearn.

Final Office Action, Oct. 25, 2013, U.S. Appl. No. 13/440,332, filed Apr. 5, 2012, File-Aware Priority Driver, Daniel Robert McLeran.

Advisory Action, Jan. 15, 2014, U.S. Appl. No. 13/440,332, filed Apr. 5, 2012, File-Aware Priority Driver, Daniel Robert McLeran.

OpenAFS for Windows Requested Features and Road Map, Secure Endpoints, Sep. 16, 2011, New York.

Jennings, Apple Fusion Drive Isn't SSD Cache, But Is Lots of Cash, Forbes.com, Oct. 25 2012, US.

Pace, Hybrid Hard Drives Explained, Yahoo, Oct. 31, 2009, Joanne Pace.

Otoo and Rotem and Seshadri, Efficient Algorithms for Multi-File Caching, In 15th International Conference Database and Expert Systems Applications, 2004,Lawrence Berkeley National Laboratory, Berkeley.

Shoshani and Sim and Gu, Storage Resource Managers: Middleware Components for Grid Storage (2002).

Frost and Mammarella and Kohler and Reyes and Hovepian and Matsuoka and Zhang,Generalized File System Dependencies, Proc. of ACM Symposium on Operating System Principles, 2007, pp. 307-320.

Oracle Development and Configuration, http://www.osmosislatina.com/oracle/part4_2.htm, Osmosis Latina, 2011.

Microblaze Processor Reference Guide, www.xilinx.com/support/documentation/sw_manuals/mb_ref_guide.pdf, Xilinx, 2008.

Wehman, File Associated Pinning, U.S. Appl. No. 13/832,505, filed Mar. 15, 2013.

Wehman, User Selectable Caching, U.S. Appl. No. 13/832,585, filed Mar. 15, 2013.

* cited by examiner

HIGH PRIORITY READ AND WRITE

CROSS REFERENCE TO RELATED APPLICATIONS

The present application claims priority to pending U.S. provisional patent application Ser. No. 61/584,188, filed Jan. 6, 2012, entitled "Smart File Location;" Ser. No. 61/584,195, filed Jan. 6, 2012, entitled "Temporal File Defragment;" Ser. No. 61/584,196, filed Jan. 6, 2012, entitled "Cache File Preloading;" Ser. No. 61/584,197, filed Jan. 6, 2012, entitled "File-Aware Caching Driver;" Ser. No. 61/584,201, filed Jan. 6, 2012, entitled "File-Aware Priority Driver;" and Ser. No. 61/584,204, filed Jan. 6, 2012, entitled "High Priority Read and Write," the contents of which are hereby incorporated by reference in their entirety.

BACKGROUND

The performance of data storage devices (DSDs) may be limited by the information available to the device from a host system. In some data storage systems, the data storage device receives very limited information from the host, such as file size and a Logical Block Address. Therefore, systems and methods are needed for improving data storage device performance.

SUMMARY

A device may comprise a driver configured to retrieve file system information related to a structured input/output (I/O) command, select priority attributes identifying whether the I/O command originated from a user-level application based on the file system information, and prioritize execution of the I/O command based on the priority attributes.

In another embodiment, a system may comprise at least one driver operating on a host device configured to intercept an I/O request, determine if the I/O request originated from a user-level application based on the information from a host device, assign priority attributes to the I/O request based on the determination, and store the priority attributes to a table accessible to a data storage device.

Another embodiment may be a method comprising inspecting characteristics of a data input/output (I/O) request, choosing priority attributes for the I/O request based on the characteristics and a program initiating the I/O request, and executing operations in an order based on the priority attributes.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Host devices may send data read or write requests to data storage devices in the form of structured input/output (I/O) commands or requests. As used herein, a structured command is a command defined by an interface-standard command format, such as a read or write command of a data storage interface standard (such as SATA). A structured command must be in the form of a data structure compatible with the interface of a data storage device. Operating system information (or file system information), such as information specific to files or operation threads, are not included as part of the structured I/O command request. A thread may be a unit of processing on an operating system, such that a single application may consist of numerous threads running simultaneously.

Data storage devices may benefit from receiving additional information about a file or I/O operation thread from a host system. This may be improved by using drivers to communicate between devices. Drivers can be computer programs designed to facilitate communication or interaction between applications or other programs, and hardware devices (e.g. between a host computer application and a data storage device). A kernel may be a part of an operating system that acts as a "bridge" between computer applications and the hardware devices of a system, such as the CPU, memory, and other hardware components. In some embodiments, systems may be improved by a system of drivers operating in the kernel of the host operating system to collect or retrieve data about a file or input/output (I/O) operation thread, and associate corresponding priority attributes with the file or operation. The data storage device can use these priority attributes set by the drivers to make informed decisions regarding files or operations, potentially improving response times, reducing latency, or otherwise improving device performance. As an example, priority attributes could be used to determine in what order various read and write commands should be executed, such as by prioritizing commands originating from a user-level application. A user-level application may be an application or command executed or issued in response to a user action.

Figure 1:
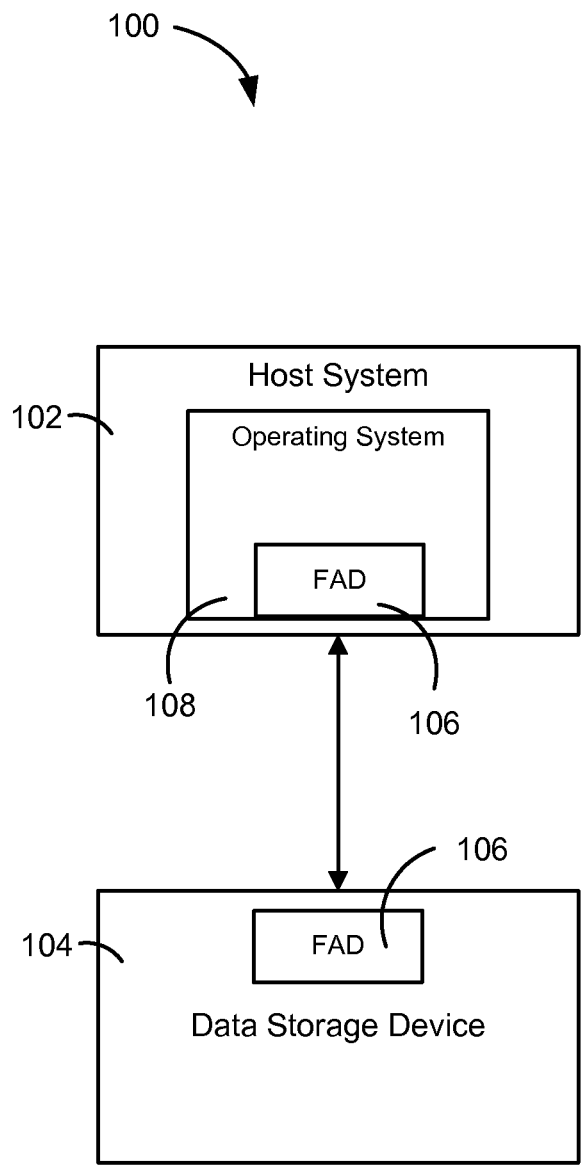
FIG. 1 is a diagram of an illustrative embodiment of a system with high priority read and write.

FIG. 1 depicts an embodiment of a system with high priority read and write generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The host 102 can include one or more file-aware drivers (FAD) 106. The FAD 106 may be drivers running in the kernel of the operating system 108 of the host 102 and may facilitate operations between the host 102 and the DSD 104. The FAD 106 can comprise software running on the host device, configurable controllers, or circuits designed to implement the functions described herein. In some embodiments, some or all of the FAD 106 may be incorporated into the DSD 104. For example, a priority policy engine driver can be incorporated on the DSD 104, while a file system filter driver and a table driver can be implemented on the host 102.

When the host 102 transmits a structured input/output (I/O) command to the DSD 104, the FAD 106 can monitor or intercept file activity in the operating system 108, including data about files themselves or the applications or threads utilizing or requesting the files. This file system data may be used by the FAD 106 or DSD 104 to improve performance or operability between the host 102 and the DSD 104. For example, the FAD 106 may send the data to the DSD 104 directly, or use the data to assign priority attributes to the I/O command or associated file. These file system data or priority attributes can be sent to the DSD 104 as part of or separately from the structured I/O command itself. The DSD 104 may use the data or priority attributes to intelligently determine in what order to execute commands received from the host 102.

Figure 2:
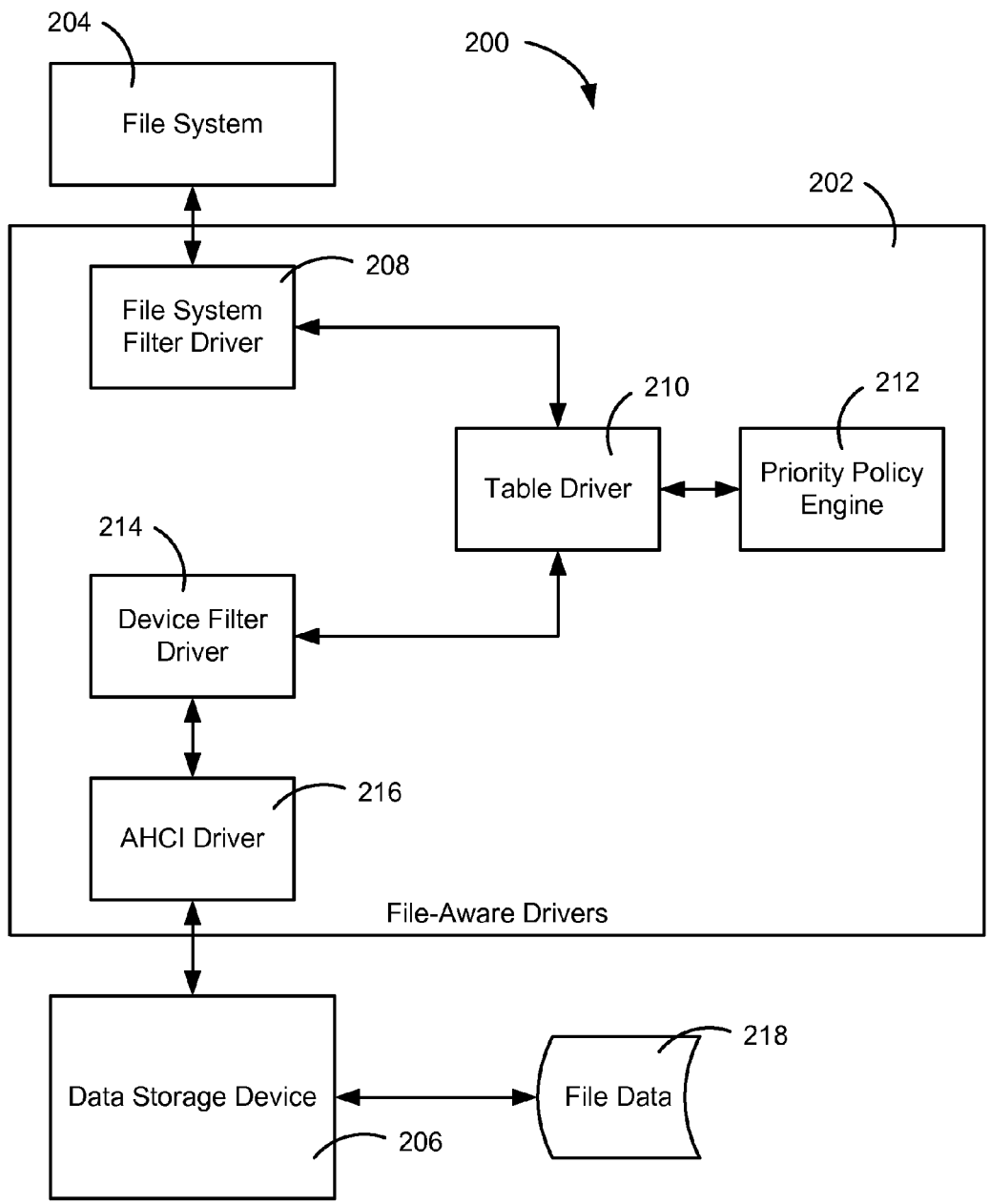
FIG. 2 is a diagram of an another illustrative embodiment of a system with high priority read and write.

FIG. 2 depicts a diagram of a system with high priority read and write generally designated 200. The system 200 may include one or more file-aware drivers (FAD) 202, a file system 204, and a data storage device (DSD) 206 which can store, retrieve, or modify data file(s) 218. The file system 204 may be the file system of a host device, used for organizing, storing, and retrieving data. Example file systems may include FAT, NTFS, or HFS Plus. The DSD 206 may be any of the devices listed for the data storage device 104, or any other device for data storage.

In the embodiment depicted in FIG. 2, the file-aware drivers (FAD) 202 may consist of a system of device drivers running in the operating system of a host device, which system may include a file system filter driver 208, a table driver 210, a priority policy engine 212, a device filter driver 214, and an Advanced Host Controller Interface (AHCI) driver 216. In some embodiments, the FAD 202 may be software, one or more programmable controllers, circuits, CPUs, or any combination of elements capable of detecting attributes of file activity within a system and associating these attributes with files or I/O operations in such a way as to affect a behavior of the data storage device 206.

The file system 204 may initiate I/O requests to read or write data to the data storage device 206. The file system filter driver 208 can interact with the file system 204 to intercept or retrieve file activity from the operating system. This may include gathering information about file(s) such as the file name, file path, file extension, file size, or logical block address (LBA) for the entire file. The intercepted file activity may also include other information, such as the system power source (e.g. A/C power or battery power), or the name or identifier (e.g. the type of accessing program, such as .exe or .dll) of the accessing executable, other information, or any combination thereof. The file system filter driver 208 may then pass relevant file information to the priority policy engine 212 through the table driver 210.

As an example, the host operating system may issue a structured I/O command requesting a block of file data 218 from the DSD 206 using a logical block address (LBA) associated with the block of data. The file system filter 208 may determine the file path and file size of the file associated with the requested data 218, as well as the type of program requesting the data. All this information may be passed along with the data I/O request to the priority policy engine 212 by way of the table driver 210.

The table driver 210 may maintain the relationship between a file or piece of data 218, the thread ID of the processing thread requesting the input/output (I/O) operation, and the file information from the file system filter driver 208 or the priority attributes set by the priority policy engine 212. In some embodiments, the table driver 210 may only maintain the relationship between the file and the file information, or between the thread ID and the file information. The table driver 210 may maintain these relationships in a table, database, self-contained data packets, other formats, or a combination thereof.

The priority policy engine (PPE) 212 can inspect the information collected by the file system filter driver, such as file extension, file size, file path, creation attributes, and the name of the accessing executable. This information may be sent to the PPE 212 by the table driver 210, or the PPE 212 may independently inspect a table, database, or other data structure maintained by the table driver 210. Upon inspection of the file properties, the PPE 212 can determine whether to set priority attributes for the current file and/or I/O operation thread immediately, or to delay setting priority attributes until later. For example, if file information is unavailable or insufficient at the file system filter driver 208 level, the PPE 212 may request to be called again at the device driver filter 214 level. Furthermore, priority attributes may be set at one or more points in the lifecycle of a file object, such as on first access of the file, subsequent accesses, pre-read, pre-write, or other points. When priority attributes have been set, the table driver 210 may then update to maintain the relationship between the file or operation thread and the priority attributes set by the PPE 212.

The priority attributes set by the PPE 212 can be used to determine in what order to execute read or write commands, or for other operations of the data storage device 206. Data storage devices may receive or process a number of I/O requests simultaneously or in rapid succession, and may select the order in which the requests will be processed. Priority attributes can be used by a data storage device to implement or improve I/O request prioritization. The PPE 212 may select priority attributes based upon configurable settings. For example, a user of the host system 102 or data storage device 104 may be able to configure which types of attributes, files, or program requests have higher priority and should be executed more quickly, such as prioritizing I/O operations from .exe executable programs. In some embodiments, the PPE 212 may have programmed or automatic settings on how to assign priority attributes. In other embodiments, the PPE 212, the system of drivers 202, or the data storage device 206 may be configured to monitor file usage and data access and modify priority policies according to usage.

If the priority attributes have already been set by the priority policy engine (PPE) 212, the device filter driver 214 may retrieve the priority attributes from the table driver 210. If the PPE 212 has not yet set the priority attributes, the device filter driver 214 may request priority attributes from the PPE 212 through the table driver 210. The device filter driver 214 may provide any additional available information to the PPE 212 to facilitate the selection of priority attributes. Once selected, the device filter driver 214 can pass the priority attributes to the Advanced Host Controller Interface (AHCI) driver 216. Depending on the type of ACHI driver 216 in the system, the device filter driver 214 may do this by placing the priority attributes into a Small Computer System Interface (SCSI) Request Block (SRB), a Command Descriptor Block, or other block of data and instructions for the data storage device (DSD) 206 recognized by the AHCI driver 216.

The Advanced Host Controller Interface (AHCI) driver 216 can receive the priority attributes from the device filter driver 214. The AHCI driver may then pass the priority attributes to the data storage device 206. If the priority attributes were sent to the AHCI driver as part of an SCSI Request Block (SRB) or similar data block, the AHCI driver 216 can copy out the attributes. As an example, the AHCI driver 216 may copy the priority attributes into a Frame Information Structure (FIS), which is a block of data for Direct Memory Access (DMA) reads and writes. This may be accomplished by setting a priority bit in an FIS for First-Party Direct Memory Access (FPDMA) Queued read or write commands, to take advantage of Native Command Queuing (NCQ) technology in Serial ATA drives. The priority attributes may be sent to the data storage device separate from the structured I/O command issued by the host After receiving the priority attributes, the data storage device 206 may use the attributes to determine priority behavior or for other functions. For example, it may use the priority attribute values to determine an order of executing operations, with certain priority attribute values resulting in immediate or high-priority execution, and other values resulting in low-priority execution. A high priority operation or file may be one with a higher priority than other operations or files, while a low priority operation or request may have a lower priority than other operations or files.

The system of FAD 202 depicted in FIG. 2 is an illustrative embodiment only, and it should be apparent to one skilled in the art that the functions described may be performed by more or fewer drivers, or that some functionality may be implemented as part of the data storage device rather than in the host system. For example, a single driver can perform all the functions of obtaining file information, assigning priority attributes, maintaining an association table, and passing the information to a data storage device. Alternately, drivers can obtain file information and pass it to a data storage device, where priority attributes would then be selected. In other embodiments, file system information may be determined and stored in a table on the host. The data storage device can access and retrieve the file system information from the host and set priority attributes based on the file system information. Removing, adding, consolidating, or restructuring the drivers may eliminate the need for some functions or behaviors described herein, or add additional requirements.

Figure 3:
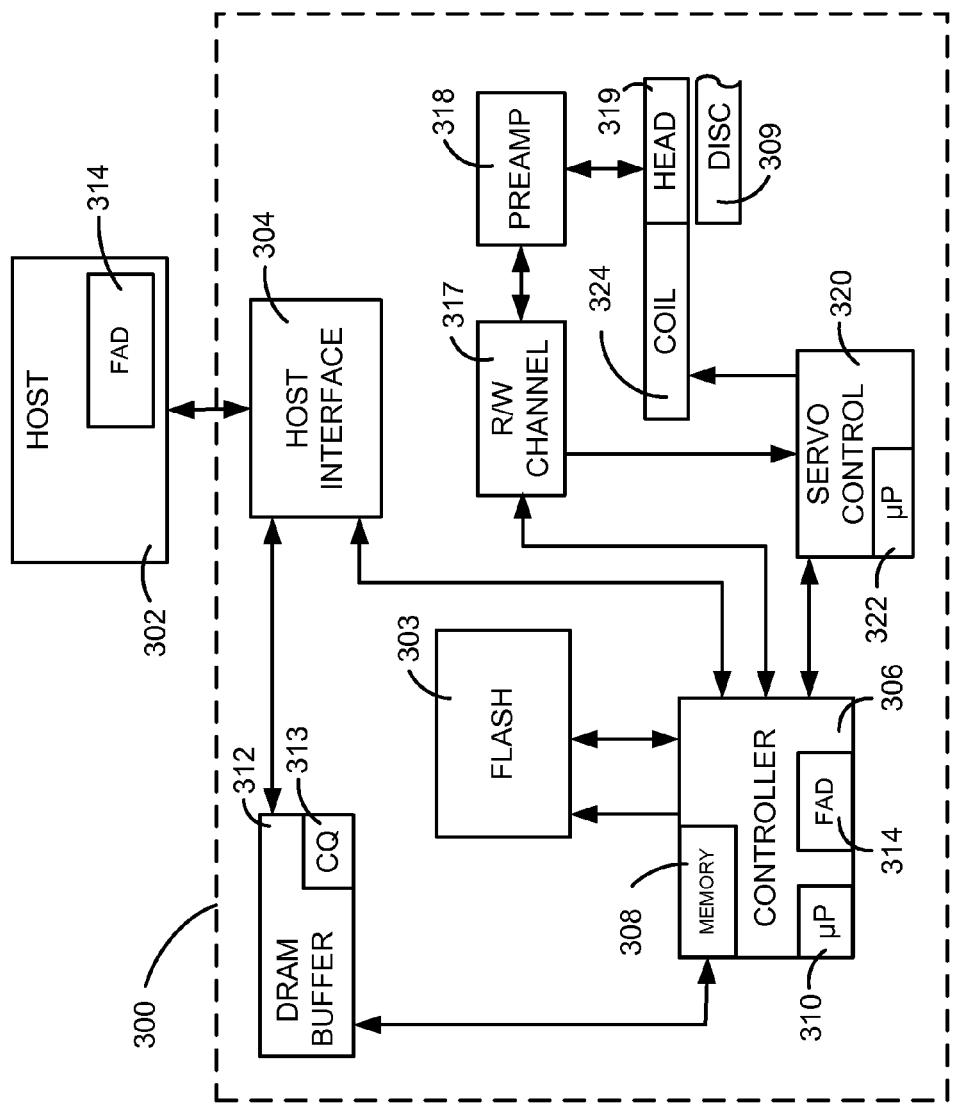
FIG. 3 is a diagram of a an illustrative embodiment of a data storage device employing high priority read and write.

FIG. 3 is a diagram of another illustrative embodiment of a system utilizing file-aware drivers (FAD), generally designated 300. Specifically, FIG. 3 provides a functional block diagram of a disc drive data storage device (DSD) 300. The DSD 300 may be a data storage device such as the device 104 shown in FIG. 1. The data storage device 300 can communicate with a host device 302 (such as the host system 102 shown in FIG. 1) via a hardware/firmware based host interface circuit 304 that may include a connector (not shown) that allows the DSD 300 to be physically removed from the host 302. The buffer 312 can temporarily store user data during read and write operations and can include a command queue (CQ) 313 where multiple pending access operations can be temporarily stored pending execution. A nonvolatile solid state memory 303, such as Flash memory, can be included for additional cache or buffer memory, or to provide additional addressable data storage for the DSD 300. The DSD 300 can include a programmable controller 306 with associated memory 308 and processor 310. In some embodiments, the controller 306 may also include file-aware drivers (FAD) 314, or elements to perform one or more functions describes for FAD herein, such as using file information from the host 302 operating system to assign priority attributes.

Further, FIG. 3 shows the DSD 300 can include a read/write (R/W) channel 317, which can encode data during write operations and reconstruct user data retrieved from disc(s) 309 during read operations. A preamplifier/driver circuit (preamp) 318 can apply write currents to the head(s) 319 and provides pre-amplification of readback signals. A servo control circuit 320 may use servo data to provide the appropriate current to the coil 324 to position the head(s) 319 over the disc(s) 309. The controller 306 can communicate with a processor 322 to move the head(s) 319 to the desired locations on the disc(s) 309 during execution of various pending commands in the command queue 313.

The host 302 (or in some embodiments, the controller 306 or data storage device 300) may be loaded with a system of file-aware device drivers (FAD) 314. The FAD 314 can collect information from the host 302 about files or system threads requesting I/O operations, and use this information to assign priority attributes to the files or threads. These priority attributes may be sent to the DSD 300, which can use the attributes to organize pending operations in the buffer 312 and command queue 313. Intelligent priority queuing can result in important operations being executed more quickly, and important files being written or retrieved more quickly than operations of lesser importance.

File aware drivers may be used to prioritize the execution of commands for certain applications or programs or for certain kinds of data. For example, by prioritizing read or write commands issued by applications based on user input, the user would experience faster response times. Important host background processes may be prioritized to keep a system running smoothly. Alternatively, certain background processes like routine file scans may be given lower priority so that they have a minimal impact on system performance.

Figure 4:
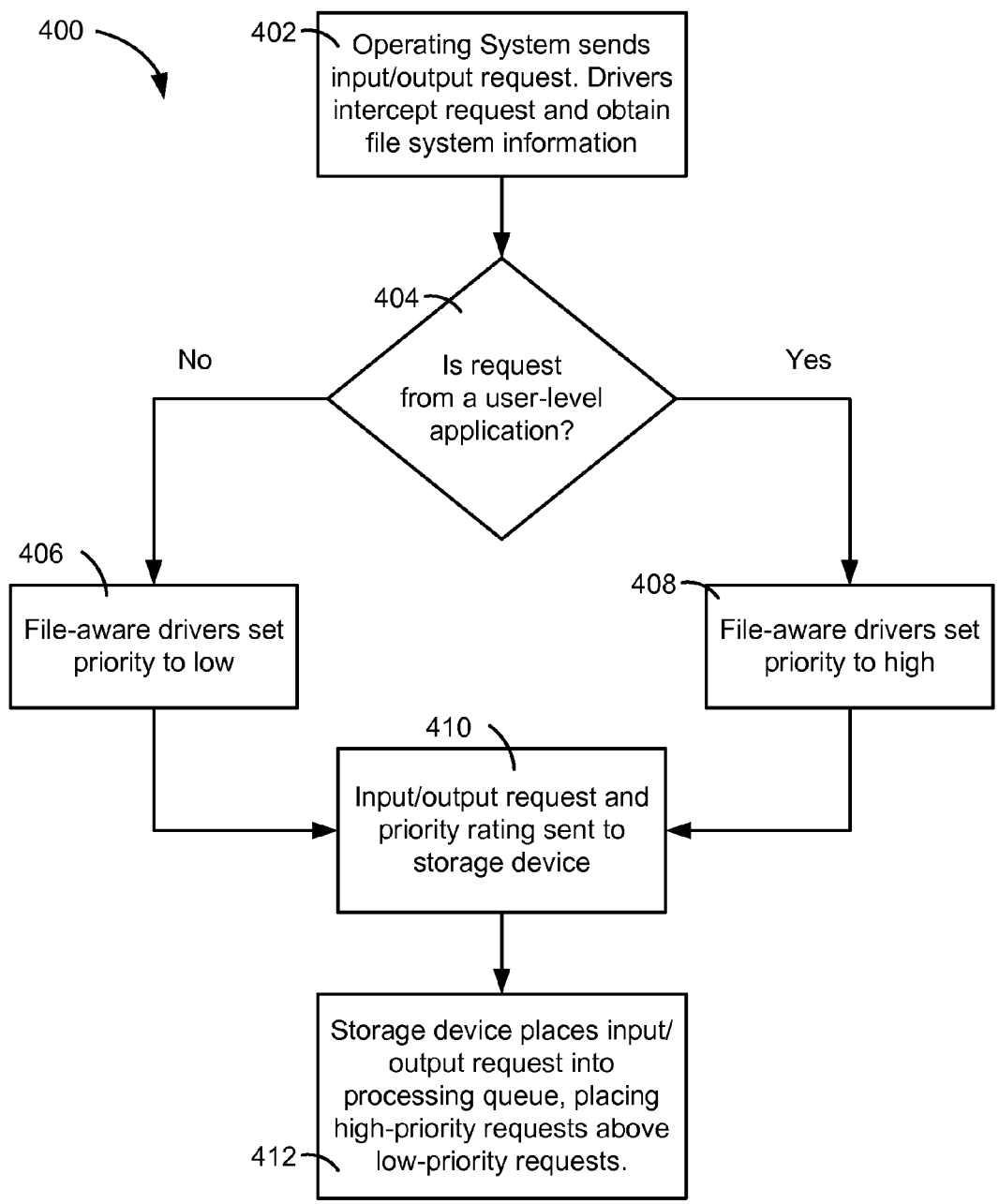
FIG. 4 is a flowchart of an illustrative embodiment of a method of employing high priority read and write.

Turning now to FIG. 4, a flowchart of an illustrative embodiment of a method of employing high priority read and write is shown and generally designated 400. The depicted method can be used in a system of file-aware drivers such as the system depicted in FIG. 2. The method 400 can involve a host system sending an input or output request (I/O request) to read data from or write data to a data storage device, at 402. The request may originate from an application or program running on the host system, or from a particular application thread. File-aware drivers may obtain additional information from the host file system regarding the requested file or the requesting application, and use this file system information to select priority attributes.

Once an I/O request has been initiated at 402, the method 400 may involve file-aware drivers or the data storage device determining whether the I/O request originated from a user-level application, at 404. A user-level application may be an application or command executed in response to a user action. User-level applications may be determined in a number of ways, such as by analyzing the type of application that issued the I/O request (e.g. a .exe file), or the type of requested file (e.g. a .doc word processor document). In some embodiments, a user can select when a command, application, or file should receive a high priority designation.

If the I/O request did not originate from a user-level application, the priority for that I/O request can be set to low, at 406. If the I/O request did originate from a user-level application, the priority can be set to high, at 408. This determination may be made by file-aware drivers at either the host or data storage device level, and the results may be included in the priority attributes. In some embodiments, the priority attributes may simply include information about the I/O request or file, and the data storage device may determine whether to categorize the request as high or low priority. Priority may be set in a number of ways, such as by toggling a bit designating something as either high priority or not, or priority can be set on a more flexible scale, such as from 1-10.

In the embodiment of the method 400 depicted in FIG. 4, the I/O request and the priority rating may be sent to the data storage device at 410. The I/O request and the priority rating, as well as any other priority attributes, may be sent to the data storage device as one command or as separate data packets. As discussed above, some steps of the method 400 may be executed in a different order, such as by having the I/O request and the priority attributes sent to the data storage device first, followed by setting a priority rating for the request.

The data storage device may next place the I/O request into a processing queue or command queue according to the priority rating associated with the request, at 412. High priority requests may be placed higher in the queue for quicker execution, while low priority requests may be placed lower in the queue. The data storage device may be configured to insert a high priority request into the top of the queue so that it is executed next, or it may be placed farther down the queue to avoid perpetually delaying already queued requests. Other factors may also contribute to queue placement. For example, the data storage device may also consider where the requested data for a command is located on a data storage medium, and queue commands according to the efficiency of accessing the corresponding files. A command not designated as high priority may be placed low in the queue, or it may be placed into the queue according to when it would be most efficient to access the corresponding file while executing other commands in the queue.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    an interface circuit to communicate with a host;
    a command queue coupled to the interface circuit;
    a driver configured to store pending operations in the command queue in an order of intended execution priority based on a priority attribute by:
        obtaining file system information from the host related to a structured input/output (I/O) command via the interface circuit, the file system information including information associated with the structured I/O command that is not received by the interface circuit as part of the structured I/O command;
        determining a priority attribute identifying whether the structured I/O command originated from a user-level application at the host based on the file system information;
        prioritizing an order of execution of the structured I/O command based on the priority attribute; and
        placing the structured I/O command into a position of the command queue so that the structured I/O command will be executed prior to an operation not originating from a user-level application when the priority attribute indicates the structured I/O command originated from a user-level application.

2. The device of claim 1, further comprising the driver includes a controller and software designed to execute the functions of the driver.

3. The device of claim 1 wherein the priority attribute are selected based on a type of application that initiated the structured I/O command.

4. The device of claim 1 wherein the priority attribute are selected based on a file involved in the structured I/O command.

5. The device of claim 1 wherein the priority attribute include a priority value for the structured I/O command.

6. The device of claim 1 further comprising:
    the host, including:
        a data storage device including the interface circuit and the driver; and
        a host driver configured to:
            intercept the structured I/O command from the host to the data storage device;
            obtain file system information from the host about the structured I/O command; and
            provide the file system information to the data storage device.

7. A system comprising:
    a controller configured to:
        intercept an input/output (I/O) request from a host device to a data storage device;
        obtain file system information from the host device about the I/O request, the file system information including information associated with the I/O request that is part of the I/O request;
        select a priority rating identifying whether the I/O request originated from a user-level application based on the file system information; and
        prioritize an execution order of the I/O request based on the priority attributes including placing the I/O request in a command queue to be executed prior to an operation not originating from a user-level application when the priority rating indicates the I/O request originated from a user-level application.

8. The system of claim 7 further comprising:
    the data storage device including:
        an interface circuit to communicate with the host; and
        the controller, the controller further configured to:
            intercept the I/O request and obtain the file system information via the interface circuit.

9. The system of claim 7 further comprising:
the command queue to store pending operations including the I/O request and other data operations; and
the controller configured to execute the I/O request and other data operations in an order based on priority ratings.

10. The system of claim 7 comprising the controller further configured to:
select the priority rating based on settings set by a user.

11. The system of claim 8 further comprising:
the data storage device configured to execute the I/O request and other data operations in an order based on the priority attributes.

12. The device of claim 1 wherein the driver is further configured to place the structured I/O command into a position of the command queue so that the structured I/O command will be executed after an operation originating from a user-level application when the priority attributes indicate the structured I/O command did not originate from a user-level application.

13. A device comprising:
an interface circuit to communicate with a host;
a command queue coupled to the interface circuit;
a driver configured to:
  obtain information from the host related to a command via the interface circuit, the information including file system information associated with the command that is not received by the interface circuit as part of the command;
  determine a priority rating, based on the file system information, identifying whether the command originated from a user-level application at the host based on the information received from the host that is not received as part of the command; and
  prioritize an order of execution of the command in the command queue such that the command will be executed prior to an operation not originating from a user-level application when the priority rating indicates the command originated from a user-level application.

14. The device of claim 13 further comprising the driver configured to:
place the command into a position of the command queue so that the command will be executed after an operation originating from a user-level application when the priority attributes indicate the command did not originate from a user-level application.

15. The device of claim 13 wherein the information received from the host includes an indicator of the priority rating corresponding to the command.

16. The device of claim 13 further comprising:
a controller configured to execute multiple pending commands in the command queue based on an order of the commands in the queue.

17. The device of claim 16 further comprising:
a data storage medium coupled to the controller, wherein at least some of the multiple pending commands are data storage commands corresponding to the data storage medium.

18. The device of claim 17 further comprising:
the host coupled to the interface circuit; and
the host including:
  a file system;
  at least one driver configured to:
    determine a priority rating of the command based on whether the command originated based on a user-level application of the file system;
    send the command via the interface circuit; and
    send the priority rating, via the interface circuit, separately from the command.

19. The device of claim 17 further comprising:
the at least one driver is further configured to:
  inspect file system information corresponding to the command; and
  determine the priority rating for the command based on the files system information.

* * * * *